(12) United States Patent
Strüwing et al.

(10) Patent No.: US 10,214,840 B2
(45) Date of Patent: Feb. 26, 2019

(54) METHOD OF PRODUCING A SANDWICH PANEL CORE OF MINERAL WOOL FIBRES

(71) Applicant: Rockwool International A/S, Hedehusene (DK)

(72) Inventors: Christian Strüwing, Copenhagen N (DK); Jens Eg Rahbek, Frederiksberg (DK); Mohammed Rashid, Maastricht (NL)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 15/529,389

(22) PCT Filed: Nov. 24, 2015

(86) PCT No.: PCT/EP2015/077492
§ 371 (c)(1),
(2) Date: May 24, 2017

(87) PCT Pub. No.: WO2016/083368
PCT Pub. Date: Jun. 2, 2016

(65) Prior Publication Data
US 2017/0321359 A1 Nov. 9, 2017

(30) Foreign Application Priority Data
Nov. 24, 2014 (EP) .................................... 14194479

(51) Int. Cl.
*B32B 5/12* (2006.01)
*D04H 1/58* (2012.01)
(Continued)

(52) U.S. Cl.
CPC .............. *D04H 1/58* (2013.01); *B32B 5/12* (2013.01); *B32B 5/26* (2013.01); *B32B 7/12* (2013.01); *B32B 37/1207* (2013.01); *B32B 38/0004* (2013.01); *D04H 1/4209* (2013.01); *D04H 1/4218* (2013.01); *D04H 1/4226* (2013.01); *D04H 1/559* (2013.01); *D04H 1/74* (2013.01);
(Continued)

(58) Field of Classification Search
CPC ............... Y10T 428/18; Y10T 428/183; Y10T 428/187; Y10T 428/24992; Y10T 428/24124; E04B 2001/7683; B32B 5/12
See application file for complete search history.

(56) References Cited

U.S. PATENT DOCUMENTS 4,552,793 A 11/1985 Cameron et al.

FOREIGN PATENT DOCUMENTS

WO 9210602 A1 6/1992
WO 2003054264 A1 7/2003
(Continued)

*Primary Examiner* — Alexander S Thomas
(74) *Attorney, Agent, or Firm* — Dinsmore & Shohl LLP

(57) ABSTRACT

A method of producing a sandwich panel core of mineral wool fibers from a cured mineral fiber product includes the steps of providing a cured mineral fiber product with a dual density having a top layer with mineral fibers with a first density and a base layer having mineral fibers with a second density, the second density is at least two times lower than said first density. The top layer and the base layer have different fiber orientations. Further steps including cutting the mineral fiber product into a plurality of lamellae, rotating the lamellae 90 degrees, and re-joining the lamellae so that the top layers with the first density are vertically oriented.

14 Claims, 1 Drawing Sheet

Figure 1:
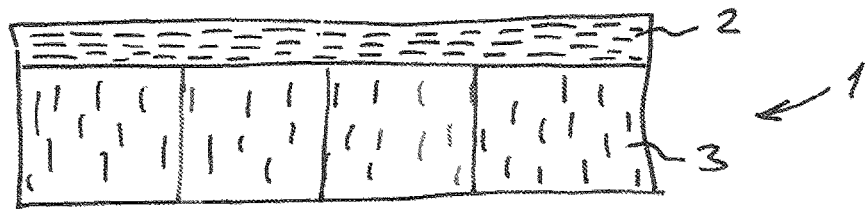

(51) Int. Cl.

| | |
|---|---|
| *D04H 1/4209* | (2012.01) |
| *D04H 1/4218* | (2012.01) |
| *D04H 1/4226* | (2012.01) |
| *E04C 2/16* | (2006.01) |
| *B32B 5/26* | (2006.01) |
| *B32B 7/12* | (2006.01) |
| *B32B 37/12* | (2006.01) |
| *B32B 38/00* | (2006.01) |
| *D04H 1/559* | (2012.01) |
| *D04H 1/74* | (2006.01) |
| *E04C 2/292* | (2006.01) |

(52) U.S. Cl.
CPC ............... *E04C 2/16* (2013.01); *E04C 2/292* (2013.01); *B32B 2255/02* (2013.01); *B32B 2255/205* (2013.01); *B32B 2262/08* (2013.01); *Y10T 428/18* (2015.01); *Y10T 428/24124* (2015.01); *Y10T 428/24992* (2015.01)

(56) References Cited

FOREIGN PATENT DOCUMENTS

| WO | 2007085260 A1 | 8/2007 |
|---|---|---|
| WO | 2014090670 A1 | 6/2014 |

METHOD OF PRODUCING A SANDWICH PANEL CORE OF MINERAL WOOL FIBRES

CROSS REFERENCE TO RELATED APPLICATIONS

This application claims priority to PCT/EP2015/077492 filed Nov. 24, 2015, which claims priority to EP14194479.3 filed Nov. 24, 2014.

The present invention relates to a method of producing a sandwich panel of mineral wool fibres.

In WO 92/10602 there is disclosed a method of producing sandwich panel core composed of interconnected mineral wool fibre lamellae, where the general fibre direction of in the lamellae is predominantly at right angles to the major surfaces of the resulting sandwich panel to increase compression strength. In WO 2005/124048 there is disclosed a reinforced sandwich panel core, where there are reinforcements in the core to increase compression strength.

To improve the thermal insulation performance of such a panel it is desired to reduce the density. This is also advantageous from a cost perspective. However, when the density of the mineral wool core, i.e. the base layer, is reduced the compression strength is reduced too. Therefore, it is the object by the present invention to provide a method of producing mineral wool fibre panels with increased compression strength while the production of the panels remains cost-effective.

This object is achieved by a method of producing a sandwich panel core of mineral wool fibres from a cured mineral fibre product, said method comprising the steps of:
  providing a cured mineral fibre product with a dual density comprising a top layer comprising mineral fibres with a first density and a base layer comprising mineral fibres with a second density, which is at least two times lower than said first density, and wherein said top layer and said base layer have different fibre orientations;
  cutting said mineral fibre product into a plurality of lamellae,
  rotating said lamellae 90 degrees, and
  re-joining the lamellae so that the top layers with high density are vertically oriented.

By a method according to the invention, a simple method is provided for producing a panel with increased compression strength of the core, i.e. the base layer. By cutting the product into lamellae and then rotating the lamellae around their longitudinal axis by 90 degrees, the high density top layer of the dual density mineral fibre product will then form reinforcing stringers that ensure the necessary compression strength of the panel.

By the invention it is found advantageous that the compression strength of the panel can be easily selected and produced without any significant extra production costs, since the thickness of the high density top layer may easily be adjusted when the mineral fibre wool product is produced, for instance in accordance with WO 2014/090670.

It is generally not considered necessary to join adjacent lamellae, but in some specific applications it may be considered advantageous, e.g. if the sandwich panel core may be subject to shear force. In such case the step of re-joining the lamellae after the rotation comprises the step of adhering the cut and rotated lamellae to each other by applying an adhesive.

The dual density mineral fibre product is preferably formed by the steps of:
  providing the top layer web comprising uncured mineral wool;
  providing the base layer web comprising cured mineral wool;
  joining the uncured top layer web and the cured base layer web to form an assembled laminate; and then curing the top layer web in a curing oven by transporting the assembled laminate into a curing oven comprising an upper conveyor and a lower conveyor for curing the assembled laminate, said assembled laminate being positioned between said upper and lower conveyors, wherein the uncured top layer web is compressed by at least 50% upon entry into the curing oven.

By this method of preparing the mineral fibre wool product, the fibre orientation of the top layer is substantially horizontal before the step of cutting. Similarly, the fibre orientation of the base layer is substantially vertical before the step of cutting. During this method of preparation, the top layer after compression is preferably provided with a first density of at least two to three times the second density of the base layer.

In an embodiment of the invention, the first density is 150-300 kg/m$^3$, preferably approx. 230-250 kg/m$^3$. Additionally, the second density is 50-100 kg/m$^3$, preferably approx. 65-70 kg/m$^3$.

An advantageous aspect of the invention relates to a mineral wool fibre panel core, wherein the panel comprises first and second elongate elements which are parallel to each other, and wherein the first elongate elements have a first density and with a fibre orientation parallel to the top and bottom surfaces of the panel, and the second elongate elements have a second density and with a fibre orientation substantially orthogonal to the top and bottom surfaces.

Preferably, the width of the first areas is 80-90 mm, preferably 85 mm and the width of the second areas is 15-20, preferably 17 mm.

Facings of different type and material may be may be applied to the mineral wool fibre sandwich panel, e.g. glass fibre reinforced facings or wood fibre reinforced facings. Such facings may be relatively rigid and strong, but preferably pliable enough to be supplied in rolls to facilitate mass production.

In a preferred embodiment a sandwich panel comprising a sandwich panel core of the above-mentioned kind further comprises a metal facing on the top and bottom surfaces of the sandwich panel core.

Figure 2:
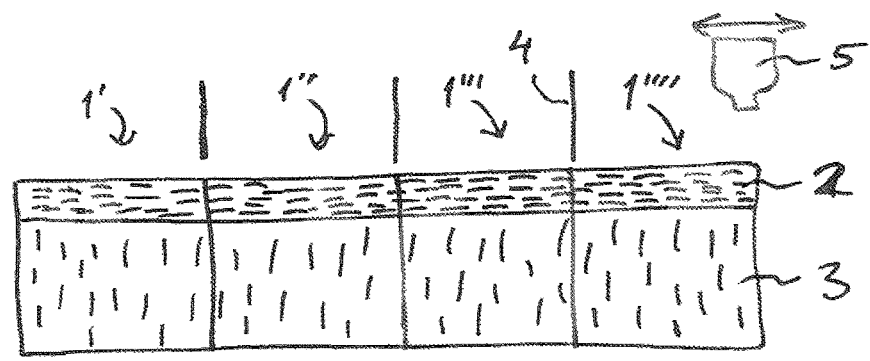
Figure 3:
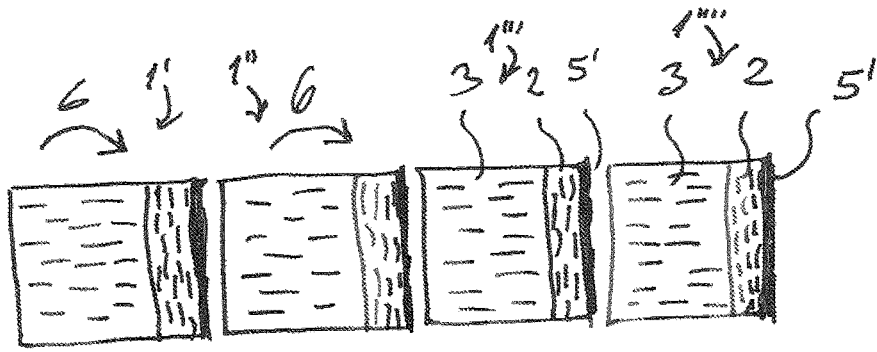
Figure 4:
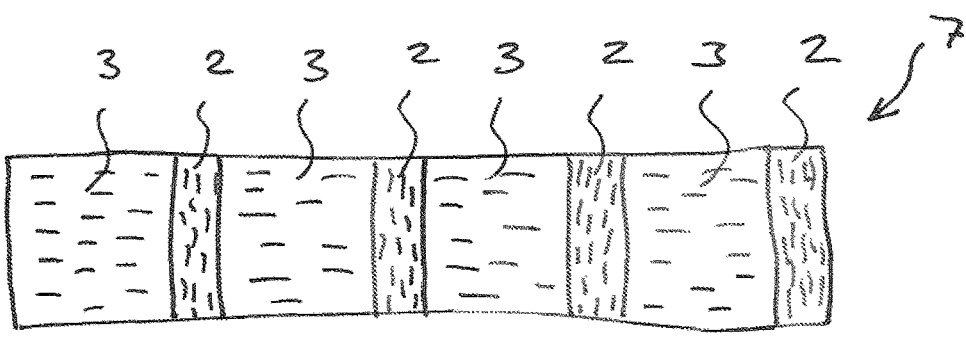

In the following the invention is described in more detail with reference to the drawings, in which:
  FIG. 1 is a schematic cross-sectional view of a mineral wool fibre panel according to the prior art;
  FIGS. 2 and 3 show the method steps according to the present invention; and
  FIG. 4 shows the sandwich panel of mineral wool fibres according to the invention.

In FIG. 1, there is shown a cured mineral fibre product 1 which preferably is made by the manufacturing method according to WO2014/090670. The mineral fibre product is a dual density panel comprising at a top layer 2 comprising mineral fibres with a first density and a base layer 3 comprising mineral fibres with a second density, which is considerably lower than said first density. The top layer 2 and the base layer 3 have different fibre orientations. The top layer 2 has the mineral fibres generally horizontally oriented whereas the base layer 3 has a vertical fibre orientation. The vertical fibre orientation in the base layer 3 is preferably achieved by producing the mineral fibre web with horizontal fibre orientation and then cutting this web into lamellae and then assembling these lamellae into the base layer 3 of the product, such as described in WO2014/090670.

The cured dual density mineral fibre product schematically shown in FIG. 1 is then the starting panel for the method of producing a sandwich panel of mineral wool fibres according to a preferred embodiment of the invention.

According to this embodiment, the product 1 is cut into lamellae 1', 1", 1''', 1'''' as shown in FIG. 2. The cutting action is performed by suitable cutting tools 4, such as a band saw or the like. An applicator 5 may also be arranged to apply an adhesive 5', such as glue, to for instance the top surface of the product 1. The adhesive 5' could be applied either to the top or bottom surface or to both surfaces depending on the design of the application action. In order not to interfere with the cutting action, the step of applying the adhesive 5' may preferably be carried out after the cutting of the product 1 into the lamellae 1', 1", 1''', 1''''. However, by the invention it is realised that depending on the type of adhesive 5' the order of these two steps, the cutting and the application of the adhesive, may be altered or the step of applying adhesive may be dispensed with as the lamellae may be permanently joined with the need for applying adhesive, which could lower the fire protecting properties of the finished product.

After the cutting action, the lamellae 1', 1", 1''', 1'''' are rotated 90 degrees by a suitable rotating action 6, as indicated in FIG. 3, so that the top layer 2 with high density is vertically oriented and then the lamellae 1', 1", 1''', 1'''' are rejoined together. The lamellae 1', 1", 1''', 1'''' carry layer of adhesive 5' at least on the top of the top layer 2 so that the lamellae 1', 1", 1''', 1'''' are adhered together to form a sandwich panel 7 as shown in FIG. 4 with the high density layers being vertically arranged and the low density areas 3 therebetween.

The high density layers 2 will then form reinforcing stringers that ensure a good compression strength of the sandwich panel.

In a comparative test, three boards are tested for strength and modulus in three dimensions, i.e. tensile strength (TS) and modulus (TSM), compression (CS) and modulus (CSM), and sheer strength (SS) and modulus (SSM) as well as the total density and thermal insulation value, Lambda, was measured. The test results are listed in table 1.

The product Spanrock M was used as a reference. This board is designed for accurate cutting of lamellae providing a core material for sandwich panels and other multi-layer systems. The roof board referred to as the "old roof board" is made by a method as disclosed in WO2014/090670, and the "new board" is made according to the present invention.

The dimensions for the new board are a top layer thickness of 17 mm, a top layer density of 230 kg/m³ and a bottom layer of 85 mm thickness and 70 kg/m³ in density. The thickness of all the products in the comparative test is 102 mm.

TABLE 1

| Board type | TS [kPa] | TSM [kPa] | CS [kPa] | CSM [kPa] | SS [kPa] | SSM [kPa] | Density [kg/m³] | Lambda [mW/mK] |
|---|---|---|---|---|---|---|---|---|
| Spanrock M | 150 | 15000 | 70 | 4000 | 50 | 3500 | 100 | 42 |
| Old roof board | 140 | 13000 | 60 | 6000 | 45 | 4000 | 96 | 37 |
| New board | 150 | 20000 | 70 | 7500 | 50 | 4500 | 100 | 37 |

In general, when terms like "horizontal" and "vertical" or similar directional references are used in the present disclosure, these terms are meant to be understood as relative terms e.g. where the term "vertical" refers to the direction of the thickness of the web, panel or product and "horizontal" refers to a direction perpendicular to the thickness of the web, panel or product.

Above, the invention is described with reference to one preferred embodiment of the invention. However, it is realised that other variant may be provided without departing from the scope of the accompanying claims.

The invention claimed is:

1. A method of producing a sandwich panel core of mineral wool fibres from a cured mineral fibre product, said method comprising the steps of:
   providing a cured mineral fibre product with a dual density comprising a top layer comprising mineral fibres with a first density and a base layer comprising mineral fibres with a second density, said second density being at least two times lower than said first density, and said top layer and said base layer having different fibre orientations;
   cutting said mineral fibre product into a plurality of lamellae;
   rotating each of said lamellae 90 degrees; and
   re-joining said lamellae so that said top layers with said first density are vertically oriented.

2. The method according to claim 1, wherein the step of re-joining comprises adhering the cut and rotated lamellae to each other by applying an adhesive.

3. The method according to claim 1, wherein said cured mineral fibre product is formed by the steps of:
   providing a top layer web comprising uncured mineral wool;
   providing a base layer web comprising cured mineral wool;
   joining said uncured top layer web and said cured base layer web to form an assembled laminate;
   curing said top layer web in a curing oven by transporting the assembled laminate into a curing oven comprising an upper conveyor and a lower conveyor for curing said assembled laminate, said assembled laminate being positioned between said upper and lower conveyors;
   wherein said uncured top layer web is compressed by at least 50% upon entry into said curing oven.

4. The method according to claim 3, wherein the fibre orientation of said top layer is substantially horizontal before the step of cutting.

5. The method according to claim 3, wherein the fibre orientation of said base layer is substantially vertical before the step of cutting.

6. The method according to claim 3, wherein said top layer after compression is provided with a first density of two to three times the second density of the base layer.

7. The method according to claim 1, wherein said first density is 150-300 kg/m3.

8. The method according to claim 1, wherein the second density is 50-100 kg/m3.

9. A mineral wool fibre panel core made by performing a method according to claim 1, wherein the panel comprises first and second elongate elements which are parallel to each other, and wherein the first elongate elements have a first density and with a fibre orientation parallel to the top and bottom surfaces of the panel, and the second elongate elements have a second density and with a fibre orientation substantially orthogonal to the top and bottom surfaces.

10. A panel according to claim 9, wherein a width of first areas of the base layer in each of said lamellae is 80-90 mm and a width of second areas of the top layer in each of said lamellae is 15-20.

11. A sandwich panel comprising a sandwich panel core according to claim 9, and further comprising a metal facing on the top and bottom surfaces of the sandwich panel core.

12. A panel according to claim 9, wherein a width of first areas of the base layer in each of said lamellae is 85 mm and a width of second areas of the top layer in each of said lamellae is 17 mm.

13. The method according to claim 1, wherein said first density is approximately 230-250 kg/m3.

14. The method according to claim 1, wherein said first density is approximately 65-70 kg/m3.

* * * * *